June 11, 1957  J. WYLEN  2,795,757
TOROIDAL FERROMAGNETIC CORE TESTING
Filed May 15, 1953  3 Sheets-Sheet 1
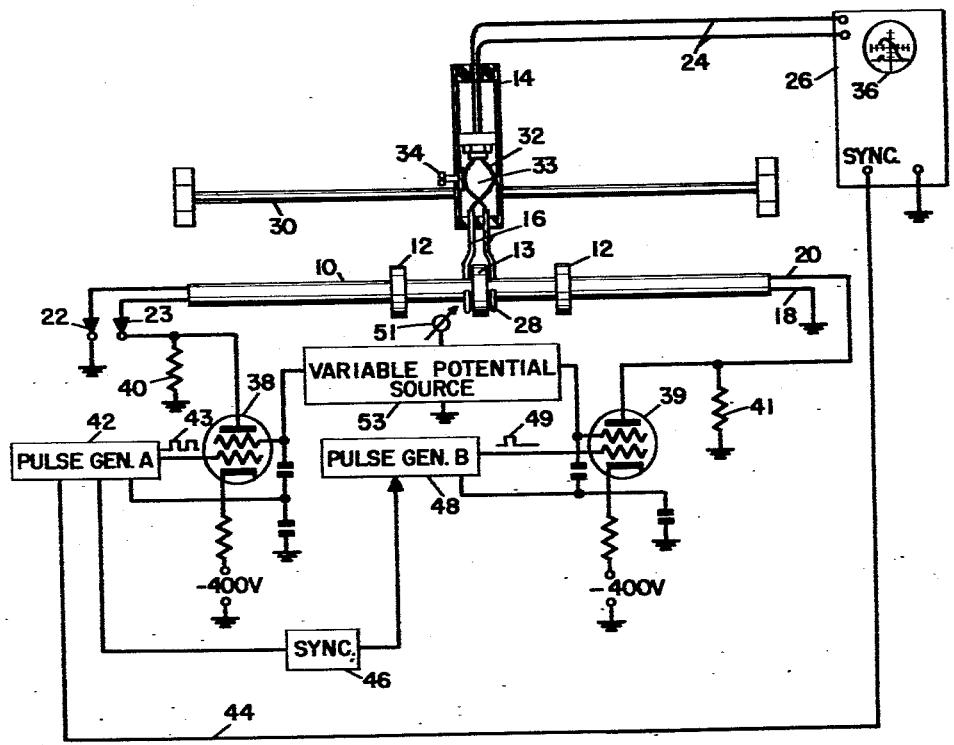
FIG. 1
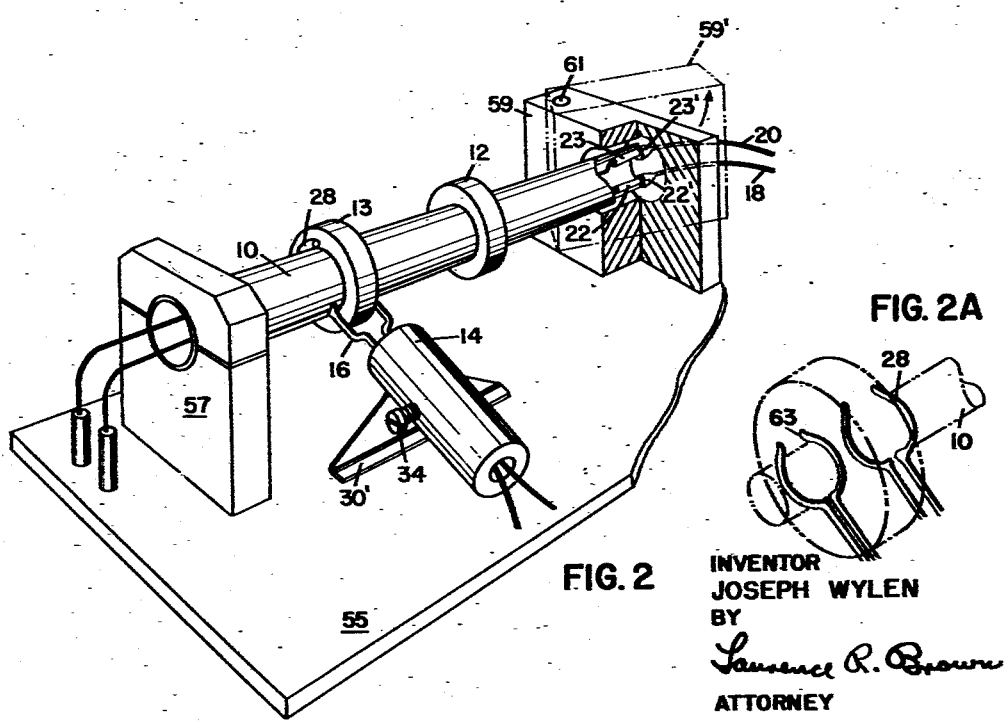
FIG. 2
FIG. 2A
INVENTOR
JOSEPH WYLEN
BY
Lawrence R. Brown
ATTORNEY

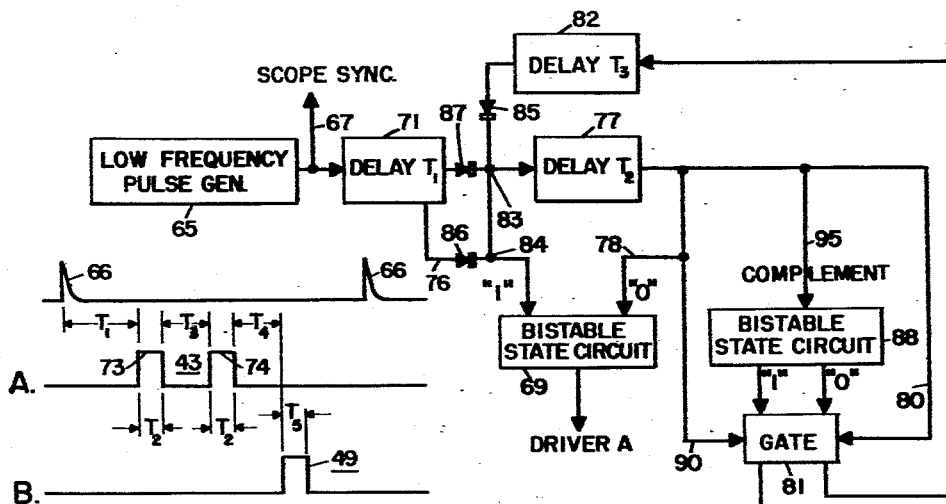
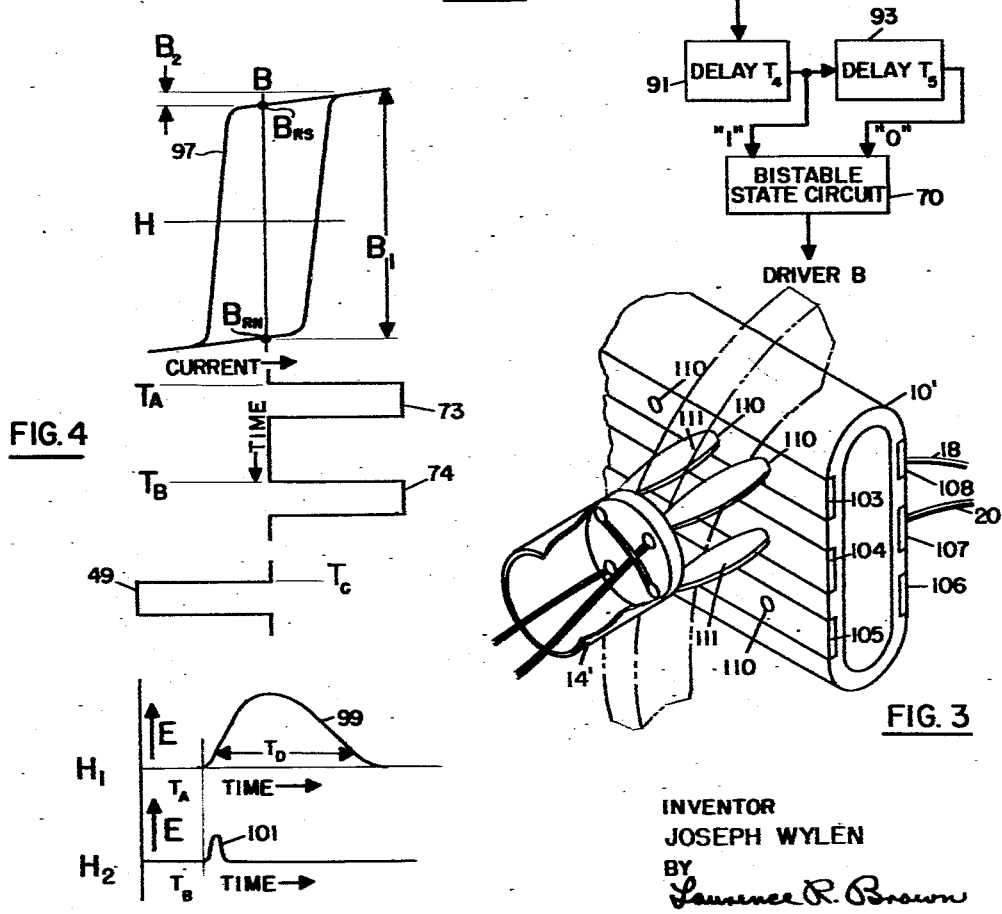

June 11, 1957   J. WYLEN   2,795,757
TOROIDAL FERROMAGNETIC CORE TESTING
Filed May 15, 1953   3 Sheets-Sheet 3

INVENTOR
JOSEPH WYLEN
BY
Lawrence R. Brown
ATTORNEY

United States Patent Office 2,795,757
Patented June 11, 1957

2,795,757
TOROIDAL FERROMAGNETIC CORE TESTING

Joseph Wylen, Philadelphia, Pa., assignor to Burroughs Corporation, Detroit, Mich., a corporation of Michigan Application May 15, 1953, Serial No. 355,278

20 Claims. (Cl. 324—34)

This invention relates to electronic testing instruments for toroidal ferromagnetic cores.

Toroidal cores of ferromagnetic materials having a substantially square hysteresis loop and magnetic remanence properties have come into wide spread usage in the construction of binary elements in digital data processing and storage systems. It has been found that properties desirable in anlyzing the adaptability of ferromagnetic cores for this use are, (1) the squareness of the hysteresis loop, (2) the switching time from one magnetic remanence polarity to the other, and (3) the response of the cores at different input excitation levels. The squareness test will afford an indication of the expected response ratios of a given core to respective signals which do and do not change the remanence condition of the core. The switching time test affords a measure of the expected maximum operational frequency, and the excitation level test may be used to indicate the adaptability of cores for particular circuit conditions as well as the operational efficiency.

Manufacture and processing techniques of toroidal cores of the type described may be critical. The cores are usually made of a number of turns of thin ferromagnetic ribbon wrapped on a bobbin. These may be be welded and annealed after winding, if desired. Tolerances in core winding, welding, annealing and ribbon dimensions or properties may vary considerably from unit to unit, thereby necessitating individual test of finished units. Since it is expensive to put transformer windings about toroidal cores, commercial type testers should be capable of indicating the core properties so that rejections may be made before coils are wound thereon.

Such testing equipment has heretofore been proposed. Use has been made therein of a conductive rod-like spool for mounting a plurality of cores, so that a pickup probe could be quickly connected to the conductive rod on either side of any desired core to form with a portion of the rod a single output turn about the core. A pulsed current source coupled to a winding through the center of the rod is used as an input winding to excite the core. In some respects, however, prior art equipment has been found inadequate. For example, small variations in pickup probe characteristics may cause erratic output indications. It is moreover difficult to mount cores upon the conductive rod because the input excitation winding must be disconnected therefrom each time different cores are threaded upon the rod. The amount of output indication available from a single turn is generally lower than might be desired. A general shortcoming to the testing and using of toroidal cores is the difficulty of placing multi-turn windings thereabout.

It is, therefore, a general object of the invention to provide improved techniques for testing toroidal ferromagnetic cores.

It is a more specific object of the invention to provide means for readily mounting a plurality of toroidal cores upon a suitable testing mount.

Another object of the invention is to provide simplified means for placing multi-turn windings about toroidal cores.

A further object of the invention is to provide improved pickup probe means for use with test equipment.

Still further it is an object of the invention to provide an electronic system for testing the squareness of hysteresis loops, the switching time and the relative response to different driving pulses of different ferromagnetic core materials.

In accordance with the present invention, therefore, a conductive rod type core mounting element is provided with means for permitting cores to be readily mounted and demounted thereon. A novel structural arrangement has been discovered for simply establishing a winding of several turns about toroidal cores when desired. Unique structural design of a pickup probe assembly to be used with the core testing means afforded by the invention is included so that more precise measurements may be taken. These features are incorporated in a simplified test instrument with electronic exciting circuitry and display means cooperating therewith to provide an efficient high speed toroidal core testing system adapted to measure the properties of the cores before they are provided with transformer windings.

Further objects and features of advantage of the invention will be found throughout the following more detailed description of the invention, its organization and operation, presented in connection with the accompanying drawings, in which:

Fig. 1 is a diagrammatic representation of a core testing system constructed in accordance with the invention;

Figs. 2 and 2a are perspective views, partially in section, of a core mounting and exciting assembly embodiment of the invention;

Fig. 3 is a diagrammatic view in perspective of novel structural means adapted for quickly connecting a plurality of windings through toroidal cores;

Fig. 4 is a graphical chart illustrating the core properties tested and the corresponding display response pattern obtained in accordance with the invention;

Fig. 5 is a block circuit diagram, with associated waveforms, of an electronic system for obtaining exciting currents for operation in accordance with the principles of the invention.

Figure 6:
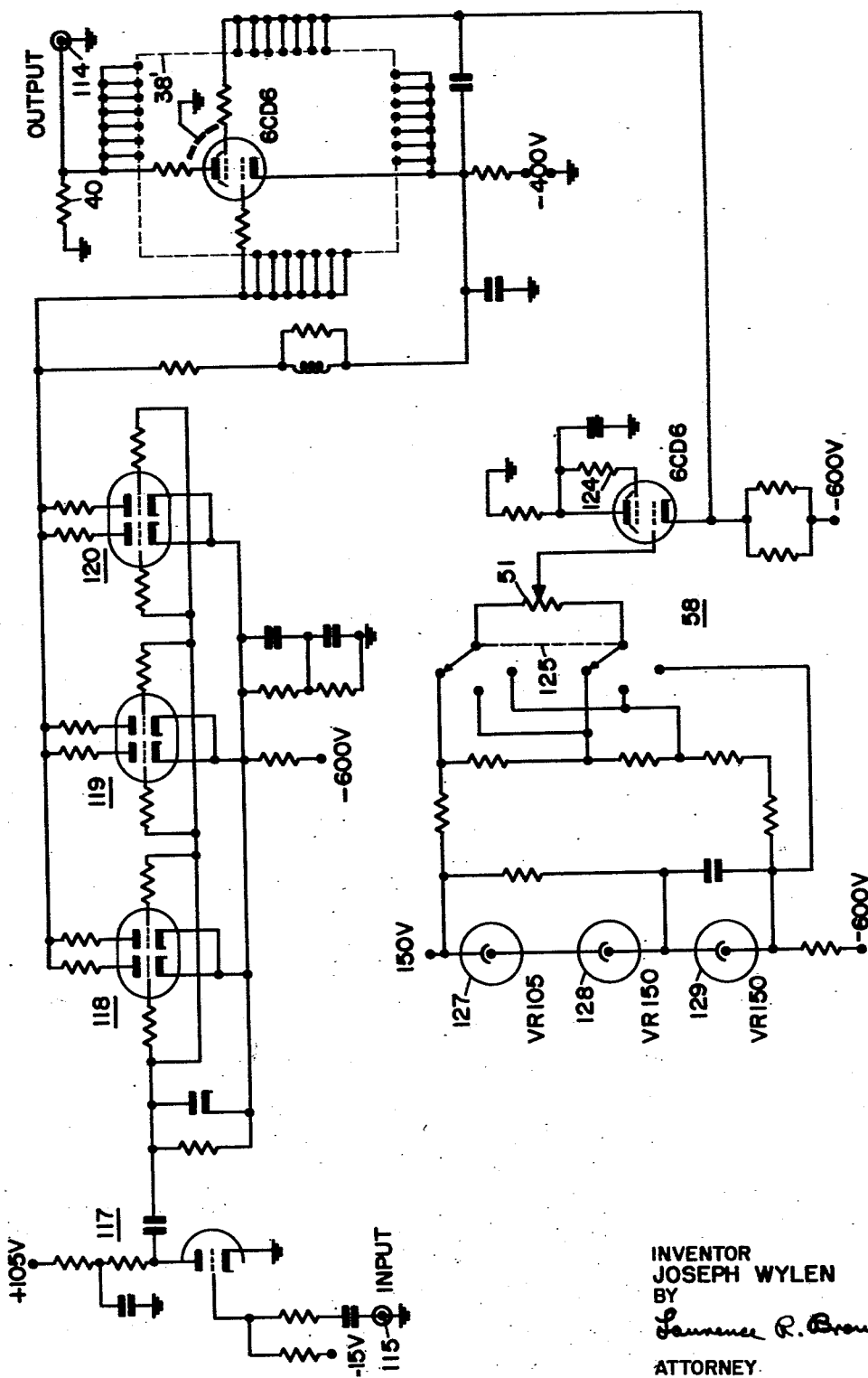
Fig. 6 is a schematic circuit diagram of means for supplying variable driving pulses in accordance with a further phase of the invention.

Referring now in particular to the drawings, like reference characters will designate similar circuit elements throughout the respective views to facilitate comparison. Those elements, which of themselves are entirely conventional and whose details form no part of the present invention are shown in block diagram form to more clearly point out the nature and scope of the present invention. Those features believed descriptive of the nature of the invention are defined with particularity in the appended claims.

The general organization of a testing instrument provided in accordance with the present invention is shown in Fig. 1. The instrument is of the type wherein an electrically conductive rod or spool 10 is provided for threading through a plurality of toroidal ferromagnetic cores 12 and 13. As will later be shown the rod may be a printed circuit type structure or any similar desirable configuration. A test probe 14 is provided with a pair of electrically conducting tines 16 for contacting the rod 10 on either side of one of the toroidal cores 13 to form therewith a single turn output winding about the core. Input circuit windings for the respective cores may be provided by passing the conductors 18 and 20 through the inside of conductive rod 10. The conductors 18 and 20 are provided with selectively detachable connector fittings 22 and 23 at one end so that toroidal cores may be threaded upon the rod 10 or taken off at will. Connected with the probe 14 by means of the cable 24 is suitable display means such as the oscilloscope 26, which is connected for superimposing a pair of output voltage versus time response traces in the oscilloscope display pattern by means to be described hereinafter.

It has been found that the requirements for a pickup probe 14 are rather critical for providing a true indication of the toroidal core properties. For example, if the tines 16 are permitted to have a variable length the associated circuitry will not respond in the same manner for each core which is to be tested because of varying loop impedance. Therefore suitable means such as the hooked ends 28 are desirable to cause the tines to contact the rod 10 about a fixed length matrix surface each time a core is tested.

Varying pressure of the tine contact may also be sufficient to cause the circuit impedance to change. Accordingly, positioning structure is desired to assure the same contact conditions upon each engagement of the tines with the rod 10. In this embodiment the probe 14 is shown balanced about a positioning rod platform 30 parallel to the rod 10 which provides a pivot fulcrum near the front of the probe 14 utilizing the weight distribution thereof to maintain the tines in forced contact with the rod 10. In this manner, substantially the same electrical conditions will be provided by the probe assembly for each core which may be tested without the necessity of the operator taking any unusual precautions.

It has also been discovered that the field developed about the conductors 18 and 20 and therefore about the tines 16 may excite erroneous currents in the pickup loop of probe 14 which prevent proper indications during measurement of core characteristics. Movement of the probe 14 may change the indications, and a large initial "signal" may result even without a core being included. Accordingly, a variable electrical balancing circuit winding 32 is connected in the probe for cancelling any effects of the surrounding field. This balancing circuit may comprise the crossover loop or electromagnetic winding 32 having several turns wound in opposition to that of the pickup winding comprising the tines 16 and the enclosed portion of rod 10. The winding encompasses a selectively variable area 33 which may be adjusted by means of the screw 34. By adjusting both the area encompassed by the balancing winding and the orientation of the winding, any effect due to fields which might encounter the tines 16 without any intervening core may be exactly cancelled out so that any output indication would be a true indication of the core characteristics.

In order to produce the indicated display pattern 36 on oscilloscope 26, suitable circuitry is provided for passing a series of successive current pulses through the conductors 18 and 20. These pulses may be derived from power amplifier tubes 38 and 39 which respectively have their anodes connected directly to ground by way of the corresponding conductors 18 and 20 within the rod 10. In this manner high current may be obtained for exciting the toroidal cores without raising the potential above ground near the operator to provide danger of shock when using the testing equipment or of trouble with stray electrical excitation caused by physical proximity of the operator or other equipment to the exciting conductors. Since the conductors 18 and 20 may be selectively disconnected by means of fittings 22 and 23, auxiliary resistive loads 40 and 41 of higher impedance than the conductors 18 and 20, thereby being in the order of a few ohms, are connected from the plates of tubes 38 and 39 to ground to protect the tubes in event the fittings are disconnected with the equipment turned on. In this manner cores may be readily threaded upon the rod 10 while the tubes have potential applied without the danger of causing them to draw too much screen grid current.

It is noted that it may be desirable under some conditions to provide multi-turn input and output windings for test equipment of this type. Novel structural means for accomplishing this will be described in connection with Fig. 3. In actual practice the power amplifier tubes may comprise a plurality of parallel connected tubes, should the current requirements of a single tube not be sufficient.

To provide the exciting current in the conductive lead 18 a suitable pulse generator 42 is afforded providing groups 43 of two successive output pulses for driving power amplifier tube 38. These pulses are caused by way of synchronizing lead 44 to trigger the oscilloscope sweep circuit to provide a double trace upon which may be superposed the core response curve for the corresponding pulses. The response pattern and its relationship to the core characteristics will later be described in more detail along with Fig. 4. A further synchronizing circuit 46 is utilized to trigger a second pulse generator 48 affording the single output pulse 49 similar in characteristics to one of those provided by pulse generator 42, and adapted for driving the further power amplifier tube 39. The output current pulses generate a magnetizing force in the cores upon the rod 10 by means of conductors 18 and 20 in opposite polarities because currents flow through the conductors in opposite directions. Timing of the output pulse 49 is such that the cores may be reset into a particular remanence polarity, so that upon the next appearance of the group of exciting pulses 43, they may cause the synchronized core response indications to occur upon the oscilloscope 26. Each of the current pulses flowing through the respective conductors 18 and 20 generally provides enough magnetizing force to cause the toroidal cores to attain one or the other remanence condition.

Suitable adjusting means 51 may be utilized for changing the output potential of the screen grid potential supply circuit 53. Control of the potential supply connected to the screen grid circuits of the respective driving amplifiers 38 and 39 respectively adjusts the amount of output current flowing through the separate conductors 18 and 20. By this means a large range of exciting current pulse amplitudes may be realized without changing any other circuit conditions and affording substantially the same waveform shape for pulses of all amplitudes.

To afford more ready testing of a large number of cores, structural features such as shown in Fig. 2 may be incorporated in the test equipment with advantage. In this embodiment the rod 10 is mounted upon platform 55 by means of brackets 57 and 59. Mating connector fittings 22 and 23 are affixed in the end of the rod 10 so that the movable bracket 59 may be pivoted about axis 61 thereby selectively supporting one end of the rod 10. This provides means for automatically disconnecting the mating connector fittings 22' and 23' to which the flexible portions of the conductors 18 and 20 are connected. It is therefore readily seen that by pivoting the bracket 59 into its dotted position 59', cores 12 and 13 may be readily entered upon or removed from the rod 10, and are immediately ready for testing as soon as the movable bracket 59 is replaced in register with the end of rod 10.

The pivoted fulcrum desired for balancing the probe 14 may comprise the flange 30' connected with the probe and movable therewith. Upon placing the flange at any position along the platform 55 parallel to the rod 10, the curved ends 28 of the tines 16 immediately adjust themselves by the force of gravity into the proper contact along a fixed length matrix surface so that there is little danger of erroneous indication due to change of probe length or contact impedance. As shown in Fig. 2a the same result is accomplished with positioning structure having each tine comprising a spring clamp assembly 63 which may be snapped over the desired portion of the rod 10 to form therewith a forced matrix contact.

In testing the cores the output signal is difficult to detect with a single output turn about the cores as afforded by the conductive rod 10 hereinbefore described. It has not, however, in the past been feasible to provide means for readily passing more than one output winding through the toroidal core. In accordance with an important phase of the present invention, therefore, means is provided as shown in Fig. 3 for obtaining multi-turn output windings without sacrificing any of the conveniences in quickly and accurately testing cores otherwise provided by the described system. In this embodiment, the rod 10' which passes through the toroidal cores is a non-conductor base having a plurality of separate conductive paths 103 to 108 affixed thereto by means of printed circuit techniques or the like. Along certain of the conductors 103—105 are provided periodically spaced connector fittings 110 which, in the simplest embodiment, comprise apertures in the conductors. These fittings are preferably spaced in a test instrument of the type described so that they may occur close to each side of randomly placed toroidal cores along the rod. A modified test probe 14' may therefore be provided with mating connector fittings such as banana plugs 111 adapted to connect with fittings in different ones of the conductive paths 103, 104 or 105. By means such as the interconnected fittings in probe 14' the conductive paths are interconnected to produce a multi-turn winding about the core. A two turn winding is illustrated, but obvious extensions may be made if desired to produce as many turns as necessary. Thus, it is readily recognized that in accordance with this aspect of the invention, more than one output turn may be readily provided about a toroidal core without winding a wire over and over again therethrough. Some of the conductive paths 107 and 108 may be used if desired, for either single or multiple turn input excitation windings similar to the aforedescribed conductors 18 and 20. It is readily within the skill of those in the art to provide other types of connector fittings and other variations to this technique without departing from the spirit of the invention. For example, such windings need not be used in the particular core testing apparatus herein described but may be used wherever it is desirable to provide multi-turn windings about toroidal cores. The windings may enclose either a single core or a plurality of cores, and if convenient the separate conductors need not be as long as the rod 10, when they are not required to enclose all the cores upon the rod.

The graph and waveforms of Fig. 4 will illustrate the manner in which the aforedescribed instrument is utilized to provide desirable indications of the properties of the cores to be tested. Thus, the curve 97 represents the hysteresis characteristic of a core being tested, as displayed upon flux density (B) and magnetizing force (H) coordinate axes. A typical hysteresis curve is shown for materials desirable for use as magnetic storage elements. The magnetic remanence of one or the other polarity at points $B_r$ is attained by the core material as a stable position after a corresponding exciting pulse driving the material into magnetic saturation of the same polarity. Thus, assume the material is in a remanent position $B_{RN}$ and a suitable current pulse 73 is caused to excite the core material at time $T_A$. The core is caused to traverse the hysteresis loop with a corresponding change of flux density $B_1$ and come to rest at the stable position $B_{RS}$. A certain amount of switching time $T_a$, as shown in the response waveform 99, is necessary to achieve the change in flux density $B_1$. The waveform 99 therefore shows a typical voltage output for a core when switched. The switching time required is $T_d$ and the energy needed to provide switching is proportional to the area under the curve. By varying the amplitude of the exciting pulse 73 in the manner hereinbefore described, the response of the core to different magnetizing forces may be investigated. Waveform 99 is developed upon a time axis trace of an oscilloscope and is synchronized to correspond to the excitation pulse 73.

A second display trace is provided with waveform 101 caused in response to the second exciting pulse waveform 74 starting at time $T_B$. Since the core is now in the remanent condition $B_{RS}$ because of pulse 73, and the exciting pulse 74 is of the same polarity, a change of flux $B_2$ will occur which is much smaller than the change when the core is caused to go from one remanence condition to another. Accordingly, the waveform 101 is of much smaller amplitude and duration. A comparison of the two waveforms gives a convenient measure of the rectangularity or squareness of the hysteresis loop, and when the two waveforms are superimposed upon the oscilloscope pattern a ready comparison is immediately presented. The exciting current pulse 49 at time $T_C$ provides a magnetizing force of opposite polarity to exciting waveforms 73 and 74 because the current flows in conductors 18 and 20 in opposite directions. This serves to return the core to the initial remanence condition $B_{RN}$ for similar action with succeeding recurrences of the exciting pulses 73 and 74. It is therefore seen that the desired characteristics of ferromagnetic cores may be conveniently and quickly tested by circuits of the type described. Other tests can be performed by varying the pulse pattern, if desired.

A circuit embodiment for obtaining the desired exciting pulses to be used in the core testing instrument is described in connection with both the waveforms and block diagram of Fig. 5. A low frequency pulse generator 65 produces output waveform pulses 66 which may be utilized to synchronize an accompanying display oscilloscope if desired by means of lead 67. Synchronization pulses may be derived from the system at other places if desired. Two sets of exciting pulses are produced by action of the trigger pulses 66 as shown in the waveform patterns A and B. The waveform A corresponds to waveform 43 described in connection with Fig. 1 and waveform B likewise corresponds to the waveform 49 of Fig. 1. The two 73 and 74 pulses of waveform 43 are produced by means of a bistable state circuit 69 which is connected to a suitable driver A for delivering current pulses of the nature hereinbefore described. A typical driver circuit will be described later in connection with the detailed schematic diagram of Fig. 6.

A further bistable state circuit 70 likewise produces the output waveform B. Each of the bistable state circuits is caused to attain a high potential position by a trigger pulse at the "1" terminal and is returned to the low potential state by a further pulse at the "0" terminal. Trigger pulses 66 are used to actuate these bistable state circuits at desired times by means of several delay units. Thus, delay unit 71 produces a delay time of $T_1$ which causes the leading edge of pulse 73 to be generated by actuation of the bistable circuit 69 by trigger pulse 66 arriving along lead 76. Delay unit 77 producing a delay time corresponding to the output pulse width $T_2$ causes the trigger pulse to form the trailing edge of the output pulse 73 by resetting the circuit 69 into its "0" state by way of lead 78.

To generate the second output pulse 74 of waveform A a delay $T_3$ is established between the trailing edge of pulse 73 and the leading edge of pulse 74. Thus, by medium of circuit connection 80 and gate circuit 81, the trigger pulse 66 is further delayed in the delay unit 82 to retrigger the bistable state circuit 69 into state "1" thereby forming the leading edge of pulse 74. Delay unit 82 has its output pulse also reinserted to delay unit 77 to establish a pulse width $T_2$ for pulse 74 in the same manner as pulse 73 by returning circuit 69 to the "0" state. Since there are common connections at points 83 and 84, diodes 85, 86 and 87 are inserted in the output leads of delay units 82 and 71 respectively to permit the passage of pulses in only one direction.

It is seen that the second pulse 74 of waveform A may be provided only as long as the bistable circuit 88 primes the gate 81 with its "0" output pulse. However, when the bistable state circuit 88 is in the alternate position wherein output pulse "1" primes the gate 81, the delayed synchronizing pulse corresponding to the trailing edge of pulse 74 is produced at lead 90 and is passed by gate 81 to delay unit 91 to excite the corresponding leading edge of pulse 49 (waveform B). A further delay unit 93 assures the pulse width desired for pulse 49 by causing the delayed trigger pulse to form the trailing edge by actuating the bistable state circuit 70 into its "0" position.

To afford automatic occurrence of pulse waveform B only after the completed second pulse of waveform A and before a succeeding trigger pulse 66, the delayed trigger pulse at the output of delay unit 77 is taken along lead 95 to complement the bistable state circuit 88. Thus, the circuit is caused to change state from "0" to "1" each time a pulse output occurs from delay unit 77. Accordingly, the gate circuit 81 will be alternately primed two times for each trigger pulse 66 to pass the delayed trigger pulses arriving at leads 80 and 90 and cause the waveform B to be generated once following each two pulses of waveform A. Waveforms 73 and 74 are coupled to excite suitable driver amplifier circuits. One typical form of circuit which has been found to operate satisfactorily with single turn exciting and output windings is described in connection with the schematic diagram of Fig. 6. A separate driver unit as shown may be used with each of the waveforms A and B to provide the desired amount of output driving current. High output current is provided at terminal 114 from a plurality of parellel connected 6CD6 tube 38' which operate in a manner identical to that described in connection with Fig. 1. The diagram schematically illustrates eight parallel connected tubes. Low level input signals at terminal 115 are coupled to drive the power amplifier circuits by medium of suitable pulse amplifier stages 117—120. In order to change the current amplitude of the output signals without affecting the waveform shape, the screen grid potential of the output tubes 38' is adjusted by potentiometer 51 in the variable potential supply circuit 58. A cathode follower 124 is used to maintain the proper screen potential on the output power amplifier tubes by operating as a direct current amplifier with a variable grid potential adjustment comprising both the rough adjustment provided by the stepped contacts of switch 125 and the fine adjustment provided by potentiometer 51. The input potential to the grid circuit of the cathode follower 124 is suitably regulated by means of voltage regulator tubes 127 to 129, or the like.

From the foregoing description the present invention has been made clear. Many desired specific embodiments affording the described advantages may be constructed by those skilled in the art without departing from the spirit and scope of the invention. It is clear that improved electronic testing instruments and techniques for testing toroidal ferromagnetic cores have been afforded by the invention and that certain of the aspects of the invention may have separate utility. Having therefore described the invention with particularity Letters Patent are desired for those features defined in the following claims:

I claim:

1. In an instrument for testing the squareness of the hysteresis loop of toroidal ferromagnetic cores and the switching time thereof for different values of exciting pulses including, an electrically conductive rod-like spool for mounting a plurality of said cores, and a pair of electrically conductive windings threaded through said spool, the combination comprising selectively detachable circuit connections on one end of said wires for permitting said cores to be changed upon said spool, an exciting current pulse generating means adapted to provide two successive pulses, a second current pulse generating means adapted to provide a single reset pulse following the exciting pulses, a circuit coupling current from the last two mentioned means through said pair of wires in opposite directions to excite said cores, said circuit including respective power amplifier tubes for each pulse generating means having a direct load connection from anode to ground through a corresponding one of said pair of wires, means including a cathode follower amplifier for regulating the screen grid potential of said tubes to vary the excitation current delivered by the amplifier tubes to determine the relative response of the cores to different excitation values, a probe having a pair of electrically conductive tines adapted to contact said spool about a fixed length matrix surface on either side of a core to be tested to form therewith an output winding through the core, positioning structure on said probe for assuring the same contact conditions upon each engagement of the tines with said spool, a variable electrical balancing circuit connected in said probe for cancelling effects of fields about said spool, and display means comprising an oscilloscope connected for superimposing output voltage versus time response traces derived from the probe output turn during the two successive excitation pulses.

2. An instrument as defined in claim 1 wherein the positioning structure includes mechanical mounting means for the probe comprising a platform parallel to said spool, a pivot fulcrum device including said platform for balancing the weight distribution in said probe to maintain the tines in forced contact with said spool, said tines being shaped to fit closely about said spool along a fixed length matrix surface.

3. An instrument as defined in claim 1 wherein the positioning structure includes spring clamps upon said tines forming a forced matrix contact about a portion of said spool.

4. An instrument as defined in claim 1 wherein the positioning structure includes a plurality of separate conductive paths on said spool each including a plurality of connector fittings, and mating connector fittings on said probe adapted to connect with fittings in different ones of said paths to form therewith a multi-turn pickup loop.

5. In an instrument for testing the electrical properties of toroidal ferromagnetic cores including excitation pulse generating means, conductive means, means including at least one four electrode power amplifier tube responsive to excitation pulses for passing current through said conductive means, means for selectively opening said conductive means to thread a plurality of cores thereon, and probe means selectively passing a secondary inductive loop through individual ones of the cores threaded on said conductive means, the combination comprising, an auxiliary load device coupled to said tubes of higher impedance than said conductive means, a conductive balancing winding connected with said secondary loop, mechanical means for changing the area enclosed by the balancing winding, means including a cathode follower coupling circuit for variably selecting a regulated potential for the screen grid electrode of said power amplifier tube, and means responsive to excitation in said secondary loop for displaying electrical properties of the materials of said cores.

6. An instrument as defined in claim 5 wherein the last mentioned means comprises an oscilloscope having circuits connected for superimposing on a time axis two successive voltage response traces generated in synchronism with two corresponding successive excitation pulses of the same sense applied to said cores, and means for initially conditioning the material with an excitation pulse of opposite sense.

7. In an instrument for testing the square hysteresis curve characteristics of ferromagnetic toroidal cores including an electrically conductive rod adapted to receive a plurality of cores and a probe having a pair of electrically conductive tines adapted to contact said rod on either side of a core to be tested to form therewith an output winding through the core, the improvement comprising an electromagnetic winding of selectively variable area coupled to said tines in such sense as to cancel out the effects of fields about said rod, and means for causing said tines to engage said conductive rod in forced contact along a predetermined fixed path length.

8. The improvement defined in claim 7 wherein said means comprises a platform located parallel to said rod, a probe casing having said tines protruding from the forward portion thereof and so shaped as to form a matrix surface with a position of said rod, and fulcrum means on said probe located forward of the center of gravity of said probe casing whereby firm even contact of the same path length of the tines against said rod is maintained by lever action of the probe about said fulcrum means when placed on said platform.

9. In a test instrument for determining in toroidal ferromagnetic cores the switching time and magnetic induction in response to variable driving pulses of a single sense with different remanence conditions, of the type including a hollow conductive rod for threading a plurality of cores upon, a circuit including wires along said rod for exciting the cores, a probe having conductive tines for conductively connecting a portion of said rod into a pickup loop, and display means coupled to said pickup loop, the improvement comprising a set of mating connectors adapted for registration in electrical contact, one of said connectors being mounted in one end of said rod and coupled to said wires along the rod, mechanical mounting means for selectively supporting said end of the rod including the other of said connectors adapted to register with the mating connector, and means for readily disengaging said mounting means from said rod thereby also disengaging said mating connector to facilitate the entering and removing of cores from said rod.

10. An instrument as defined in claim 9 including a housing for said probe, a crossover loop connection of conductors within said housing, and means for mechanically changing the area and orientation enclosed by said crossover loop.

11. In an instrument as defined in claim 8, means for selectively placing said conductive tines into forced contact with said conductive rod along a predetermined fixed path length.

12. Means for passing windings through toroidal cores comprising, a mounting rod having a plurality of separate conductors therealong and shaped to receive at least one toroidal core threaded thereon, external connector fittings for said conductors positioned on the rod so as to occur on either side of a core threaded on the rod, a plurality of external connector fittings adapted to mate with the fittings for said conductors, mounting means for interconnecting said plurality of external fittings with mating fittings upon a rod on both sides of said toroidal core dispersed along the rod, and circuitry associated with said mounting means for connecting said conductors in a multi-turn winding passing through said rod.

13. In an instrument for testing the squareness of the hysteresis loop of toroidal ferromagnetic cores and the switching time thereof including electrically conductive spool means for mounting a plurality of cores, exciting means for said cores including conductors through said spool means, pulse generating means, a power amplifier tube circuit connected to the pulse generating means for selectively exciting said cores into a given remanence state with two successive current pulses by way of said conductors, the combination comprising, a selectively variable screen grid potential supply for said amplifier tube circuit comprising a cathode follower coupling circuit, a probe for forced contact with said spool means to form with a portion thereof an inductive pickup loop of fixed dimensions, a crossover balancing circuit in said probe having variable area adjustment means for cancelling effects of undesired fields, display means including an oscilloscope connected for superimposing the voltage response traces generated by medium of a core in said pickup loop with said two successive pulses, and means resetting the cores on the spool in an opposite remanence state with a further successive current pulse through said conductors in opposite sense to the exciting pulses.

14. In apparatus for operating toroidal magnetic cores, the combination of a rod of a size to enter the central holes of the toroidal magnetic cores and thereby slidably receive the same thereon, said rod having a plurality of separate electrically conductive paths extending longitudinally along the surface thereof, and a member detachably engaging the rod in such a manner as to straddle a magnetic core thereon, said member having a plurality of electrically conductive paths arranged when the member is engaged with the rod to be electrically connected to the separate paths of the rod and cooperating therewith to form at least two windings about the straddled magnetic core.

15. Apparatus for forming windings about toroidal magnetic cores comprising, in combination, a substantially horizontally extending member dimensionally proportioned to serve as a base for slidably receiving toroidal magnetic cores thereon, said member having one or more longitudinally extending electrically conductive paths, each of said paths having connector fittings spaced apart from one another a distance slightly greater than the axial dimension of a toroidal magnetic core slidable on the member, a second member having a plurality of connector fittings shaped to straddle a toroidal core on the first member and engage said first described fittings, said second member having at least one electrically conductive path connecting a fitting on one side of a straddled toroidal core with a fitting on the other side thereof to form with the electrically conductive path of the first member a winding about the straddled toroidal core.

16. A probe for providing a multi-turn winding about a toroidal core threaded onto a rod comprising, a member elongated in one dimension and carrying a plurality of contacting elements on one end thereof, said contact elements projecting from the member in substantially parallel relation to one another and for a distance greater than the radial thickness of a core to be tested, said contact elements further being arranged into two groups of more than one element each and with the groups spaced apart from one another a distance slightly greater than the axial thickness of a core to be tested whereby the respective groups of elements may straddle a portion of the core and project beyond the inner radius thereof for engagement with the rod on which the cores are threaded, and circuitry carried by the member for completing a multi-turn winding about a core to be tested, said circuitry connecting a contact element of one group with a contact element of the other group.

17. In combination, a member elongated in one dimension and shaped to receive one or more toroidal magnetic cores and project axially beyond either side thereof, a pickup probe for electrically testing the magnetic cores on the member, said pickup probe being elongated in one dimension and provided on one end thereof with at least two tines arranged to straddle a magnetic core on the member and engage the latter to form a winding about the core, and means pivotally mounting the probe for swinging movement about an axis extending parallel to the longitudinal axis of the member and with the tines forming the closest part of the probe to the member, the pivotal axis of the probe bearing such a relation to the length and to the weight distribution of the probe that the probe is caused to be rocked by the force of gravity in the direction to bring the tines into engagement with the member.

18. In an instrument for testing characteristics of toroidal magnetic cores including a support for mounting one or more of said cores and provided with two electrically conductive paths for passing currents through the openings in such mounted cores, the combination comprising a pulse generating means for providing pulses evenly spaced in time, means for receiving said generated pulses and operable in response to each such pulse to deliver two successive pulses of the same polarity to one of said paths for conduction therealong before the generation of the next pulse by the pulse generating means, and means for receiving the second of said two successive pulses and operable in response thereto to deliver a pulse to the second of said paths for conduction therealong in the opposite direction to the conduction of the pulses through the first path and in the time interval between the delivery of two successive pulses to the first path and the generation of the next pulse by the pulse generating means.

19. In an instrument for testing characteristics of toroidal magnetic cores including, in combination, a support for mounting one or more of said cores and provided with electrically conductive path means for sending currents through the openings in such cores to drive the same, means for generating pulses spaced successively in time, means for receiving said generated pulses and in the time interval between two consecutive ones thereof sending two similar successive pulses along said conductive path means in one direction and a later third pulse along the conductive path means in the opposite direction, the two successive pulses sent in the one direction enabling a comparison to be made of the magnetic flux changes developed in such mounted core when it is switched from an initial remanence condition to the other remanence condition and when the core is merely saturated from the second remanence condition, and the third pulse sent in the opposite direction serving to return the core to its initial remanence condition.

20. In an instrument for testing the square hysteresis curve characteristics of ferromagnetic toroidal cores including a rod having an electrically conductive path and adapted to receive one or more toroidal cores and a probe having a pair of electrically conductive tines adapted to contact the rod on opposite sides of a core thereon to be tested to form with the rod an output winding about the core, the improvement comprising a pair of leads in the probe each connected to a separate one of the tines and arranged to form a balancing winding in the probe in opposition to the output winding formed by the tines and the rod, and means carried by the probe and controllable exteriorly thereof for moving one of the leads relative to the other lead to adjust the balancing winding so as to cancel out any magnetic field effect on the output winding other than that produced by the core under test.

References Cited in the file of this patent

UNITED STATES PATENTS

| | | |
|---|---|---|
| 1,565,519 | Spooner | Dec. 15, 1925 |
| 1,570,948 | Crouch | Jan. 26, 1926 |
| 2,133,725 | Sperry et al. | Oct. 18, 1938 |
| 2,160,540 | Drake | May 30, 1939 |
| 2,195,504 | Stone | Apr. 2, 1940 |
| 2,531,820 | Lindenblad | Nov. 28, 1950 |
| 2,679,029 | Rajchman et al. | May 18, 1954 |